(12) United States Patent
Tang et al.

(10) Patent No.: US 11,385,372 B2
(45) Date of Patent: Jul. 12, 2022

(54) METHOD AND SYSTEM FOR GENERATING A SEISMIC GATHER

(71) Applicant: SHELL OIL COMPANY, Houston, TX (US)

(72) Inventors: Zijian Tang, Rijswijk (NL); Xander Campman, Rijswijk (NL)

(73) Assignee: SHELL USA, INC., Houston, TX (US)

(*) Notice: Subject to any disclaimer, the term of this patent is extended or adjusted under 35 U.S.C. 154(b) by 925 days.

(21) Appl. No.: 16/064,353

(22) PCT Filed: Dec. 19, 2016

(86) PCT No.: PCT/EP2016/081696
§ 371 (c)(1),
(2) Date: Jun. 20, 2018

(87) PCT Pub. No.: WO2017/108669
PCT Pub. Date: Jun. 29, 2017

(65) Prior Publication Data
US 2019/0004200 A1    Jan. 3, 2019

Related U.S. Application Data (60) Provisional application No. 62/270,714, filed on Dec. 22, 2015.

(51) Int. Cl.
*G01V 1/00* (2006.01)
*G01V 1/36* (2006.01)
*G01V 1/38* (2006.01)

(52) U.S. Cl.
CPC .............. *G01V 1/366* (2013.01); *G01V 1/005* (2013.01); *G01V 1/3808* (2013.01); *G01V 2210/26* (2013.01)

(58) Field of Classification Search
None
See application file for complete search history.

(56) References Cited

U.S. PATENT DOCUMENTS 4,817,062 A * 3/1989 De Buyl ................ G01V 1/282
 367/57
4,823,326 A    4/1989 Ward
(Continued)

FOREIGN PATENT DOCUMENTS

EP    2708920 A2    3/2014
WO    02097474 A1    12/2002
(Continued)

OTHER PUBLICATIONS

Bouska, Jack. "Distance separated simultaneous sweeping, for fast, clean, vibroseis acquisition." Geophysical Prospecting 58.1 (2010): 123-153. (Year: 2010).*

(Continued)

*Primary Examiner* — Isam A Alsomiri
*Assistant Examiner* — Jonathan D Armstrong
(74) *Attorney, Agent, or Firm* — Shell USA, Inc.

(57) ABSTRACT

An initial gather of blended seismic signals induced in a common seismic receiver by a plurality of actual sources grouped in actual source groups is provided. Each actual source group has a linear source geometry that is the same for each actual source group. The plurality of sources in each actual source group is fired according to a pre-selected firing sequence that is the same for each actual source group. Actual shot records are created from the blended signals, and fictive shot records are created of seismic signals for fictive source groups that each have the same source geometry as the actual source groups, by interpolation of the actual shot records. Single source shot records of single source signals are separated by discrete deconvolution of the actual shot records and the fictive shot records. The output includes a seismic gather comprising a plurality of the single source shot records.

12 Claims, 2 Drawing Sheets

(56) References Cited

U.S. PATENT DOCUMENTS

| | | | |
|---|---|---|---|
| 5,249,122 A * | 9/1993 | Stritzke | G16H 50/50 600/431 |
| 6,327,537 B1 | 12/2001 | Ikelle | |
| 6,766,256 B2 | 7/2004 | Jeffryes | |
| 7,050,356 B2 | 5/2006 | Jeffryes | |
| 7,679,990 B2 | 3/2010 | Herkenhoff et al. | |
| 8,437,998 B2 * | 5/2013 | Routh | G01V 1/28 703/10 |
| 8,811,116 B2 | 8/2014 | Bagaini | |
| 9,250,340 B2 * | 2/2016 | Brittan | G01V 1/36 |
| 9,690,003 B2 * | 6/2017 | Sallas | G01V 1/005 |
| 2003/0093224 A1 | 5/2003 | Jeffryes | |
| 2003/0210609 A1 | 11/2003 | Jeffryes | |
| 2005/0128874 A1 | 6/2005 | Herkenhoff et al. | |
| 2008/0259726 A1 * | 10/2008 | van Manen | G01V 1/36 367/24 |
| 2010/0039894 A1 * | 2/2010 | Abma | G01V 1/362 367/52 |
| 2010/0299070 A1 * | 11/2010 | Abma | G01V 1/005 702/14 |
| 2011/0288831 A1 * | 11/2011 | Tan | G01V 1/28 703/2 |
| 2012/0008462 A1 | 1/2012 | Liu et al. | |
| 2012/0033525 A1 * | 2/2012 | Abma | G01V 1/364 367/20 |
| 2012/0075955 A1 | 3/2012 | Dean | |
| 2013/0121109 A1 * | 5/2013 | Baardman | G01V 1/36 367/24 |
| 2013/0135966 A1 * | 5/2013 | Rommel | G01V 1/3826 367/24 |
| 2013/0242696 A1 * | 9/2013 | van Groenestijn | G01V 1/364 367/24 |
| 2014/0198607 A1 * | 7/2014 | Etienne | G01V 1/247 367/15 |
| 2014/0303898 A1 * | 10/2014 | Poole | G01V 1/003 702/17 |
| 2014/0362659 A1 | 12/2014 | Tsingas | |
| 2015/0177397 A1 | 6/2015 | Bagaini et al. | |
| 2015/0260867 A1 * | 9/2015 | Abma | G01V 1/28 367/7 |
| 2015/0293249 A1 * | 10/2015 | Peng | G01V 1/364 702/16 |
| 2016/0077231 A1 * | 3/2016 | Rohn | G01V 1/364 367/7 |
| 2016/0154131 A1 * | 6/2016 | Guillouet | G01V 1/375 367/41 |
| 2016/0187516 A1 * | 6/2016 | Brenders | G01V 1/3808 367/15 |
| 2016/0341836 A1 * | 11/2016 | Poole | G01V 1/28 |
| 2017/0075015 A1 * | 3/2017 | Halliday | G01V 1/3808 |
| 2017/0123092 A1 * | 5/2017 | Schubert | G01V 1/50 |
| 2017/0160415 A1 * | 6/2017 | Winnett | G01V 1/20 |
| 2018/0164455 A1 * | 6/2018 | Elboth | G01V 1/364 |
| 2018/0164461 A1 * | 6/2018 | Halliday | G01V 1/3861 |
| 2020/0081146 A1 * | 3/2020 | Sun | G01V 1/38 |
| 2020/0116885 A1 * | 4/2020 | Abma | G01V 1/364 |
| 2020/0124755 A1 * | 4/2020 | Sollner | G01V 1/364 |
| 2020/0209427 A1 * | 7/2020 | Alkhalifah | G01V 99/005 |

FOREIGN PATENT DOCUMENTS

| | | |
|---|---|---|
| WO | 2013080128 A1 | 6/2013 |
| WO | 2013105075 A1 | 7/2013 |

OTHER PUBLICATIONS

Crump, Norman D. "A Kalman filter approach to the deconvolution of seismic signals." Geophysics 39.1 (1974): 1-13. (Year: 1974).*

Wapenaar et al., "Deblending by Direct Inversion", Geophysics, vol. 77, Issue No. 3, May-Jun. 2012, pp. A9-A12.

Bagaini et al., "The Acquisition and Processing of Dithered Slip-sweep Vibroseis Data", Geophysical Prospecting, vol. 60, May 28, 2012, pp. 618-639, XP055354787.

Bagaini et al., "Acquisition and Processing of Simultaneous Vibroseis Data", Geophysical Prospecting, vol. 58, 2010, pp. 81-99.

McWhorter et al., 3D Seismic Operational Optimization in the Lusitanian Basin, Portugal, Land Seismic, First Break vol. 30, Jan. 2012, pp. 103-108.

Bagaini et al., "Dithered Slip-sweep Acquisition", SEG Technical Program Expanded Abstracts, Oct. 2010, pp. 91-95, XP055203933.

International Search Report and Written Opinion received for PCT Patent Application No. PCT/EP2016/081774, dated Mar. 27, 2017, 11 pages.

Rozemond, "Slip Sweep Acquisition", SEG Technical Program Expanded Abstracts, 1996, ACQ 3.2, pp. 64-67.

Bouska, "Distance Separated Simultaneous Sweeping, for Fast, Clean, Vibroseis Acquisition", Geophysical Prospecting, vol. 58, Issue No. 1, Jan. 2010, pp. 123-153.

Mallat et al., "Matching Pursuits with Time-frequency Dictionaries", IEEE Trans. on Signal Processing, vol. 41, 1993, pp. 3397-3415.

Trad et al., "Accurate Interpolation With High-resolution Time-variant Radon Transform", Geophysics, vol. 67, Issue No. 2, Mar.-Apr. 2002, pp. 644-656.

Choi et al., "Analysis and Design of Minimax-Optimal Interpolators", IEEE Transactions on Signal Processing, vol. 46, No. 6, Jun. 1998, pp. 1571-1579.

Dragoset, "Marine Vibrators and the Doppler Effect", Geophysics, vol. 53, No. 11, Nov. 1, 1988, pp. 1388-1398.

International Search Report and Written Opinion received for PCT Patent Application No. PCT/EP2016/081696, dated Mar. 3, 2017, 12 pages.

Dragoset, "Marine Vibrators and the Droppier Effect", Geophysics, vol. 53, Issue No. 11, Nov. 1988, pp. 1388-1398.

Deluchi et al., "3-D Seismic Survey of the Gaggiano Oil Field with Quaternary Encoding Dual-Source Vibroseis Technique", Oct. 11-15, 1987, Technical Program, 6 pages.

Bagaini et al., Land Seismic Techniques for High Quality Data, Oilfield Review, 2010, 12 pages.

* cited by examiner

METHOD AND SYSTEM FOR GENERATING A SEISMIC GATHER

CROSS REFERENCE TO RELATED APPLICATIONS

This is a national stage application of PCT/EP2016/081696, filed 19 Dec. 2016, which claims benefit of priority of U.S. application No. 62/270,714, filed 22 Dec. 2015.

FIELD OF THE INVENTION

The present invention relates to system and method for generating a seismic gather, and to a method of recording blended seismic signals induced in a common seismic receiver.

BACKGROUND OF THE INVENTION

Seismic acquisition has been of vital importance for exploration of hydrocarbons, such as oil and/or natural gas, from subsurface earth formations, and it is becoming increasingly used in the context of monitoring the subsurface earth formations during production of these hydrocarbons as well.

The principle of seismic acquisition is that a seismic source is employed to induce seismic waves that propagate downwardly through the subsurface earth formation. The downwardly-propagating seismic waves are reflected by one or more geological structures within the subsurface earth formation, which act as partial reflectors for the seismic waves. It is possible to obtain information about the geological structure of the subsurface earth formation from seismic waves that undergo reflection within the subsurface earth formation and is subsequently acquired by one or more seismic sensors (generally referred to as seismic "receivers"). Reflected seismic waves are typically recorded during a so-called listening time. Longer listening times allow recording of multiple reflection events and/or reflection events that occurred deeper under the earth surface.

In the simplest form, a 2D or 3D seismic survey can be produced by actuating one source at a time, and recording the responses at one or more seismic receivers for the duration of the listening time, before actuating the same source again in a different location or a different source in a different location. In such so-called "single shooting" architecture, earth responses corresponding to multiple shots (or source locations) do not interfere with each other.

Various specific methods for seismic acquisition have been proposed in the past, which make use of so-called simultaneous shooting of multiple seismic sources arranged in a source array. Herewith, the acquisition time (and cost) can be lowered. However, the seismic responses from multiple shots (or source locations) interfere with each other and some form of (post-acquisition) separating of the responses is required.

One such method, which uses multiple vibrators as seismic sources, is disclosed in U.S. Pat. No. 6,766,256. The vibrators are employed to transmit seismic energy into the ground in accordance with a frequency sweep. The multiple vibrators within a vibrator group are simultaneously supplied with frequency sweeps which are identical to each other in all respects except their phases.

In another such method, sometimes referred to as "dithered sweep" method, a random time dithering is applied to the sources. This random time dithering introduces a source-specific time delay encoding among the sources within a constellation whose resultant wavefields are all superposed. An example is described in U.S. Pat. No. 7,679,990.

Other such methods have been proposed as well. Each of these simultaneous shooting schemes is designed to equip each concurrent source with some degree of uniqueness, which can then be utilized in a post-acquisition separating phase. Put in other terms, the interfering waves in the earth formation generated by the concurrent sources are incoherent. A drawback of such incoherency in the seismic responses recorded at the seismic receiver(s) is that many pre-processing techniques that are typically applied are not viable any more in the certain domains such as for instance the common-receiver domain. Among pre-processing techniques that cannot be applied are normal move-out (NMO), groundroll removal, denoising techniques, and more.

SUMMARY OF THE INVENTION

In accordance with a first aspect of the present invention, there is provided a method for generating a seismic gather, comprising:
  providing an initial gather of blended seismic signals induced in a common seismic receiver by a plurality of sources that are actuated in actual source groups, wherein the sources belonging to one actual source group, when actuated, cause mutually interfering wavefields in an earth formation which give rise to the blended seismic signals in the common receiver, wherein the sources in each actual source group are positioned relative to one primary source and according to a linear source geometry that is the same for each actual source group, and wherein the plurality of sources in each actual source group is fired according to a pre-selected firing sequence that is the same for each actual source group, and wherein successive actual source groups are fired one after another with sufficient time delay between firing of the successive actual source groups to avoid interference in time-frequency domain of a seismic wave field produced in the earth formation by each of the actual source groups with the seismic wave field produced in the earth formation by any other of the actual source groups, and wherein the successive actual source groups are laterally displaced from each other whereby the plurality of sources of all the actual source groups are mapped to a selection of pre-plot source points on a source line consisting of a regular grid of discrete pre-plot source points;
  providing actual shot records from the blended signals;
  creating fictive shot records of seismic signals for fictive source groups that each have the same source geometry as the actual source groups, by interpolation of the actual shot records with a selected interpolation operator working on the actual shot records, whereby every pre-plot source point on the source line is uniquely occupied by one primary source out of a set of primary sources of the actual source groups and the fictive source groups taken together, such that every pre-plot source point on the source line has one primary source and every primary source has one pre-plot source point;
  separating single source shot records of single source signals by discrete deconvolution of the actual shot records and the fictive shot records whereby separating signals; and
  outputting a seismic gather comprising a plurality of the single source shot records for a range of source points.

In accordance with a second aspect of the invention, there is provided a system for generating a seismic gather, comprising:

a computer readable storage medium on which is stored an initial gather of blended seismic signals induced in a common seismic receiver by a plurality of sources that are actuated in actual source groups, wherein the sources belonging to one actual source group, when actuated, cause mutually interfering wavefields in an earth formation which give rise to the blended seismic signals in the common receiver, wherein the sources in each actual source group are positioned relative to one primary source and according to a linear source geometry that is the same for each actual source group, and wherein the plurality of sources in each actual source group is fired according to a pre-selected firing sequence that is the same for each actuation of each actual source group, and wherein successive actual source groups are fired one after another with sufficient time delay between firing of the successive actual source groups to avoid interference in time-frequency domain of a seismic wave field produced in the earth formation by each of the actual source groups with the seismic wave field produced in the earth formation by any other of the actual source groups, and wherein the successive actual source groups are laterally displaced from each other whereby the plurality of sources of all the actual source groups are mapped to a selection of pre-plot source points on a source line consisting of a regular linear grid of discrete pre-plot source points;

a computer processor operatively coupled to the computer readable storage medium programmed to:
 create actual shot records from the blended signals;
 create fictive shot records of seismic signals for fictive source groups that each have the same source geometry as the actual source groups, by interpolation of the actual shot records with a selected interpolation operator working on the actual shot records, whereby every pre-plot source point on the source line is uniquely occupied by one primary source out of a set of primary sources of the actual source groups and the fictive source groups taken together, such that every pre-plot source point on the source line has one primary source and every primary source has one pre-plot source point;
 separate single source shot records of single source signals by discrete deconvolution of the actual shot records and the fictive shot records whereby separating signals; and an output device operatively coupled to the computer processor and configured to output a seismic gather comprising a plurality of the single source shot records for a range of source points.

In accordance with a third aspect of the invention, there is provided a method of recording blended seismic signals induced in a common seismic receiver, comprising:

actuating a plurality of actual sources grouped in actual source groups, wherein the sources belonging to one actual source group, when actuated, cause mutually interfering wavefields in an earth formation which give rise to the blended seismic signals in the common receiver, wherein the sources in each actual source group are positioned relative to one primary source and according to a linear source geometry that is the same for each actual source group, and wherein the plurality of sources in each actual source group is actuated according to a pre-selected firing sequence that is the same for each actuation of each actual source group, and wherein successive actual source groups are fired one after another with sufficient time delay between firing of the successive actual source groups to avoid interference in time-frequency domain of a seismic wave field produced in an earth formation by each of the actual source groups with the seismic wave field produced in the earth formation by any other of the actual source groups, and wherein the successive actual source groups are laterally displaced from each other whereby the plurality of sources of all the actual source groups are mapped to a selection of pre-plot source points on a source line consisting of a regular grid of discrete pre-plot source points; and recording the blended seismic signals from each of the actual groups by at least one common seismic receiver.

The invention will be further illustrated hereinafter by way of example only, and with reference to the non-limiting drawing.

These figures are not to scale. Identical reference numbers used in different figures refer to similar components. The person skilled in the art will readily understand that, while the invention is illustrated making reference to one or more a specific combinations of features and measures, many of those features and measures are functionally independent from other features and measures such that they can be equally or similarly applied independently in other embodiments or combinations.

DETAILED DESCRIPTION OF THE INVENTION

The present disclosure makes use of a coherent concurrent shooting scheme, for which in many useful domains such as the common-receiver domain, the coherency of the recorded signal is preserved. Blended seismic signals induced by concurrently actuated sources are recorded by at least one common seismic receiver.

Figure 1:
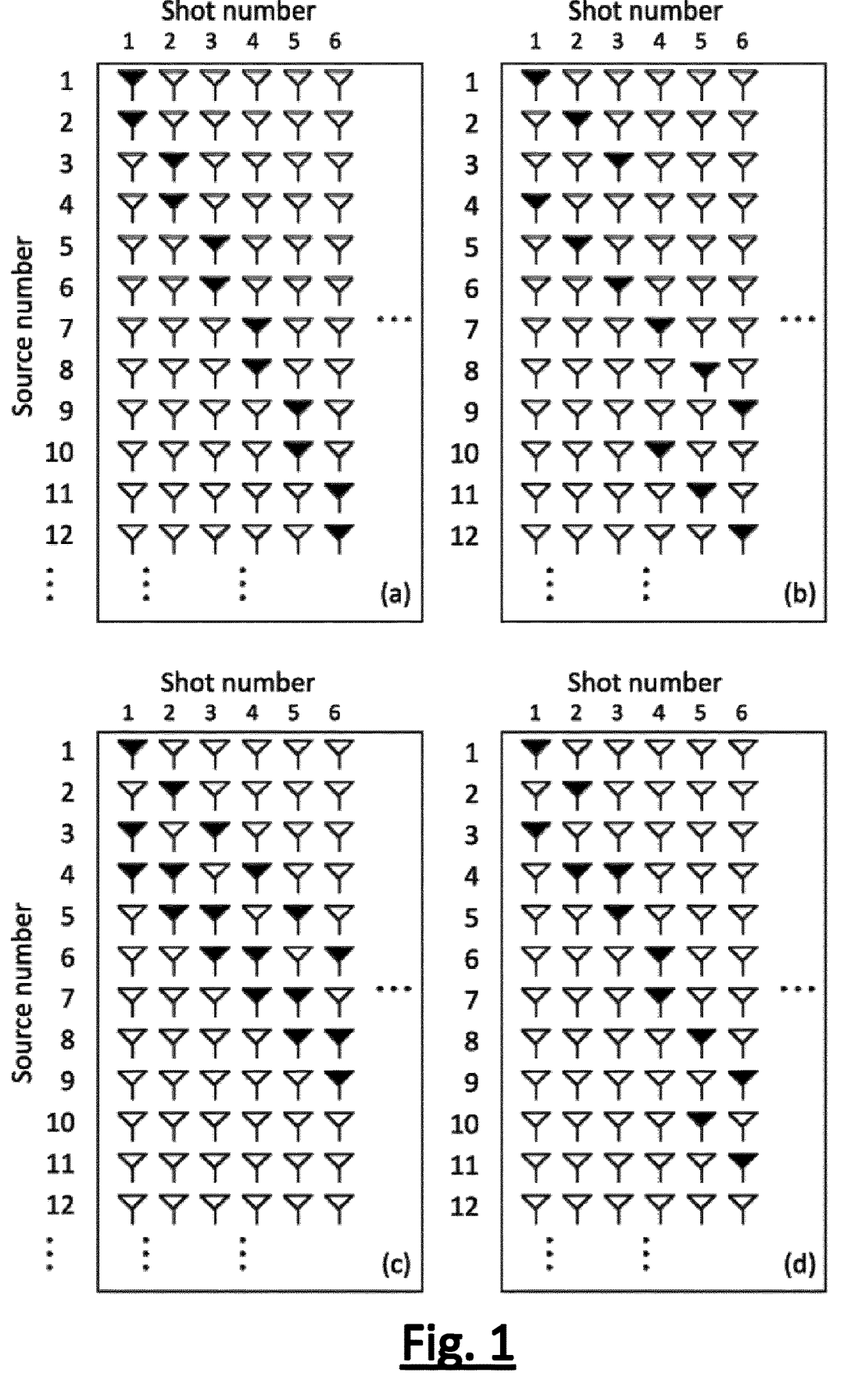
FIG. 1 (parts a to d) shows schematic representations of various examples of simultaneous shooting schemes.

There are various so-called simultaneous shooting schemes conceivable wherein seismic sources can be concurrently actuated. FIG. 1 shows schematic representations of a few examples of simultaneous shooting schemes. The filled triangles within a single shot represent actual sources that are being actuated as an actual source group. Open triangles represent source positions where no actual source is activated in each shot (i.e. inactive sources). The actuated actual sources in shot 2 may employ the same physical devices that have moved up to new source positions after having been actuated for shot 1, or they may be different physical devices. FIGS. 1(*a*), 1(*b*), and 1(*c*) are according to embodiments of the invention, FIG. 1(d) is a comparative example not according to the invention.

In the context of the present description, the term "shot" means a time period within which sources in a source group are actuated followed by some listening time.

In the context of the present description, the term "actual source" is a physical device coupled to a specific position, which, when actuated, emits energy into the subsurface at that specific position.

In the context of the present description, the term "source offset" identifies the position of a selected source relative to a reference point. Assuming all sources are located on a straight line and with one end of the source line taken as the beginning, individual sources are thereby characterized by different offsets with respect to the beginning of the line.

In the context of the present description, the term "source group" is used to indicate a plurality of actual sources fired per shot in accordance with a pre-selected firing sequence, such that the sources are fired concurrently. The concurrent sources during each shot are collectively referred to as a source group (or source array). For instance, in FIG. 1(a), source 1 and 2 form a first source group; sources 3 and 4 form a second source group, and so on. Sources 1 and 3, for instance, are not necessarily two physical devices. One set of physical devices can be used to form multiple source groups (for instance, by actuating the physical devices after moving them to new positions).

In the context of the present description, the term "group offset" is used to indicate the gravity point of a source group aperture (array length). In an equi-spaced source line with $x_k$ being the source offset of the $k^{th}$ source, such as in FIG. 1(a), the aperture of the first source group 1 is $x_3-x_1$. The group offset of the first source group 1 is then computed as $(x_1+x_3)/2$.

In the context of the present disclosure, the term "concurrent" is used when at least two actual sources are induced to start close enough in time that is overlapping in respective listening periods in time-frequency domain. Such sources cause mutually interfering wavefields in an earth formation which give rise to blended seismic signals in a common receiver.

The term "common" in "common receiver" in the context of this disclosure means "shared". The blended signals from multiple actual sources are recorded in a shared receiver.

When reference is made to "interfering wavefields" in the time-frequency domain, only interference of the fundamental frequency is considered. Interference involving harmonics is disregarded for this purpose.

Assuming the source groups have mutually the same linear source geometry, the term "primary source" in the context of the present disclosure is used to indicate one of the sources within each source group which in each of the groups has the same relative position to the other sources in the source group. Any of the sources can be designated as the primary source, as long as the same convention is used for all of the source groups. In the examples described herein, the source that has the shortest offset of the sources within one source group is designated as the primary source. For instance, in FIG. 1(a), sources 1 and 3 are primary sources; in FIG. 1(b), sources 1, 2, 3, and 7, 8, 9 are primary sources; in FIG. 1(c), source 1 is a primary source in shot 1, source 2 is a primary source in shot 2, etc.

Assuming the source groups have mutually the same linear source geometry, the terms "secondary source", "tertiary source" and so on is used to designate sources within a single source group that are not primary sources. In every source group the secondary source has the same position relative to the primary source of the same source group. Conveniently, in the examples herein the source that has the second shortest offset within the group is designated as the secondary source. For instance, in FIG. 1(a), sources 2 and 4 are secondary sources while in FIG. 1(b) sources 4, 5, 6, and 10, 11, 12. In FIG. 1(c), source 3 is the secondary source in shot 1 and source 4 in shot 2.

In the context of the present description, the term "pilot signal" is the signal that is accurately determined in advance (mostly through a computer), and used to actuate an actual source.

The following three shooting rules are proposed, which preserve coherency during the recording of the seismic signals.

Rule 1: One identical pilot signal is used for all of the primary sources. This should also hold for the secondary sources, and so on. Note that the pilot signal for the primary sources is allowed to be different from the pilot signal for other sources, as long as all sources with the same rank (primary, secondary, etc.) are actuated with the same pilot signal.

Rule 2: No dithering on the actuation time between concurrent sources within a source group. This means that any delay between the primary and secondary sources (or between the secondary and tertiary sources, and so on) should remain constant per shot. A simple implementation is to just let all the concurrent sources be actuated exactly simultaneously.

Rule 3: No dithering on the distance between concurrent sources. The source group during each shot should have the same geometry, or in other words, the spacing between the primary and secondary sources (or between the secondary and tertiary sources, and so on) remains constant per shot. The shooting schemes depicted in FIG. 1(a) through FIG. 1(c) comply with this rule, while a counter-example is given in FIG. 1(d). Note that to obviate space dithering, we have implicitly assumed that all the sources are located on a uniform grid.

Figure 2:
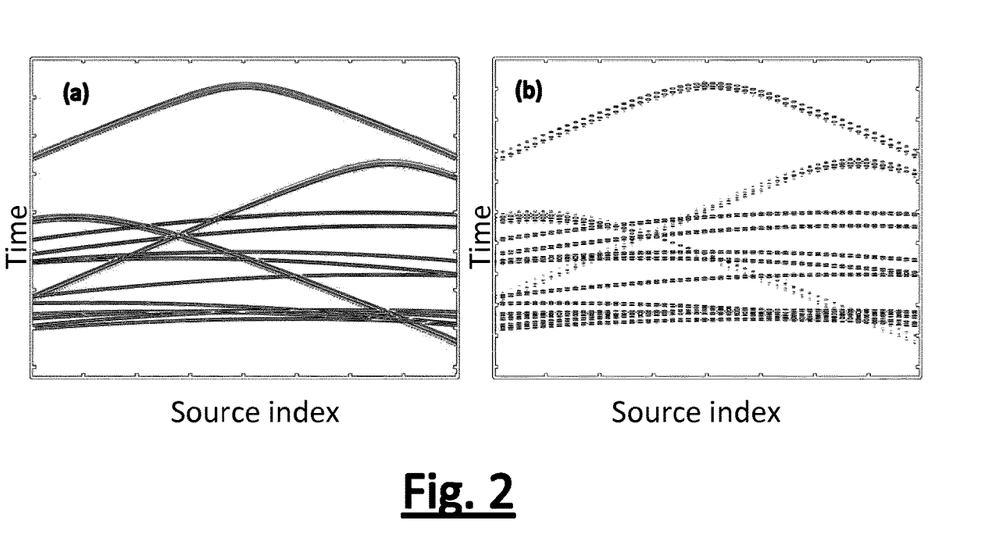
FIG. 2 (parts a and b) shows (a) a synthetic data example of a common-receiver gather for a single shooting scheme, and (b) the same data resulting from a coherent simultaneous shooting scheme as illustrated in FIG. 1(a)), where the non-zero columns correspond to the actually shot records, while the zero columns corresponds to the fictive shot records that are to be interpolated.

As example to illustrate the above idea is shown in FIGS. 2(a) and 2(b). Plotted are collections of seismic traces measured at a common receiver. Each trace is identified with a certain source index, which can be expressed as offset or in any other useful manner. In FIG. 2(a) we show a simple image of a common-receiver gather that is obtained by single shooting. This image will be used as the ground truth. FIG. 2(b) shows a common-receiver gather obtained using a coherent simultaneous shooting scheme according to FIG. 1(a).

The gather of FIG. 2(b) consists of signals induced in a common seismic receiver by successive actuations of actual sources grouped in actual source groups. Each trace represents blended signals from coherently actuated sources within a single actual source group. The plurality of sources within each actual source group are positioned according to a linear source geometry that is the same for each actual source group (consistent with Rule 3), and the plurality of sources in each actual source group is fired according to a pre-selected firing sequence that is the same for each actual source group (consistent with Rules 1 and 2). The successive actual source groups are fired one after another with sufficient time delay between firing of the successive actual source groups to avoid interference in time-frequency domain between sources that belong to different actual source groups.

The actual source groups in successive shots are laterally displaced from each other. The plurality of sources of all of the actual source groups can be uniquely mapped to a selection of pre-plot source points on a source line consisting of a regular linear grid of discrete pre-plot source points. There is a constant grid spacing between successive neighboring source points. Only the non-zero columns in FIG. 2(b) are populated with traces that contain blended signals from all the sources in a single actual source group. All the sources have been actuated by an ideal Dirac function with no delay between concurrent sources (strict synchronization). By a comparison, it can immediately be observed that the structure of the events in FIG. 2(a) is mostly preserved intact in FIG. 2(b), thanks to the proposed coherent simultaneous shooting strategy.

A new separation approach is proposed to separate the signals from the blended traces obtained using the coherent simultaneous shooting scheme, such as those shown in FIG. 2(b). The proposed separation approach is comprised of the following two steps: 1) first the measurements are interpolated to create fictive shot records of seismic signals for fictive source groups at some desired locations, and 2) a deconvolution is applied on the results obtained from the previous step together with the measurements. A proposed interpolation guideline that supports these two steps is that the fictive source groups should bear the same group geometry as the actual source groups, and further that the actual source groups and fictive source groups should be "complete" in the sense that the primary sources within all the actual and fictive source groups must contain all the individual sources.

These interpolation guidelines will prove useful in some complicated simultaneous shooting schemes. The approach will now be illustrated using the three shooting schemes as given in FIG. 1(a) to FIG. 1(c). For the sake of simplicity, in all the examples, we will assume zero delay between concurrent sources. For other coherent shooting schemes that might happen in practice but deviate from this assumption, so long as Rules 1 to 3 are complied with, the proposed separation approach can still be similarly applied.

Example A: FIG. 1(a) with Identical Pilot Signals for all Sources

This example explains how the interpolation and deconvolution steps are implemented in the case of the specific simultaneous shooting example of FIG. 1(a) with strictly simultaneous sources.

Let us denote the wavefield corresponding to an individual source k as $s_k$ and the actual shot record (measured trace) during shot n as $y_{2n-1}$, whereby n=1, 2, 3, . . . (it will be soon clear why such notations are proposed). The simultaneous shooting example in FIG. 1(a) implies that $y_1=s_1+s_2$; $y_3=s_3+s_4$; etc. This can conveniently be written in matrix form as:

$$\begin{bmatrix} y_1 \\ y_3 \\ \vdots \end{bmatrix} = \underbrace{\begin{bmatrix} 1 & 1 & 0 & 0 \\ 0 & 0 & 1 & 1 \\ & & \vdots & \end{bmatrix}}_{B} \begin{bmatrix} s_1 \\ s_2 \\ s_3 \\ s_4 \\ \vdots \end{bmatrix}. \qquad (1)$$

Equation (1) describes an under-determined system characterized by a system matrix B, which may also be referred to as the blending matrix. The objective is to recover the signals $s_k$ uniquely and correctly from the under-determined system. To tackle this problem, it is proposed to augment the matrix B in the row direction such that it gets less ill-conditioned. This is done by defining supplementing fictive traces $\tilde{y}_n$ that are related to the signals $s_k$ in a proper way with the following equalities: $\tilde{y}_{2n}=s_{2n}+s_{2n+1}$ and supplementing the linear system of equation (1) with the fictive traces. Thus, $$\begin{aligned} \tilde{y}_2 &= s_2 + s_3, \\ \tilde{y}_4 &= s_4 + s_5, \\ &\vdots \quad \text{and} \end{aligned} \qquad (2)$$

$$\begin{bmatrix} y_1 \\ \tilde{y}_2 \\ y_3 \\ \tilde{y}_4 \\ \vdots \end{bmatrix} = \underbrace{\begin{bmatrix} 1 & 1 & & & \\ & \boxed{1} & \boxed{1} & & \\ & & 1 & 1 & \\ & & & \boxed{1} & \boxed{1} \\ & & \vdots & & \end{bmatrix}}_{\tilde{B}} \begin{bmatrix} s_1 \\ s_2 \\ s_3 \\ s_4 \\ s_5 \\ \vdots \end{bmatrix}, \qquad (3)$$

wherein the supplements are highlighted by rectangular boxes. Equation (3) characterized by a blending matrix $\tilde{B}$ that is "taller" than matrix B in equation (1). An interesting property about this new system matrix is that all the entries on each diagonal of the matrix have the same value (either 1 or 0 in this case). A matrix with such a structure is known as the Toeplitz matrix, which actually suggests that the actual traces $y_{2n-1}$, together with the fictive traces $\tilde{y}_{2n}$, result from a convolutive operation between the signals $s_k$ and a (moving-average) filter [1, 1]. Consequently, it is possible to recover the signals $s_k$ from the actual traces $y_{2n-1}$ and the fictive traces $\tilde{y}_{2n}$ through a standard deconvolution operation.

Thus, the signal separation problem has reduced to finding the fictive traces $\tilde{y}_{2n}$ properly. Essentially, the signals induced by concurrent sources, e.g. $s_1$ and $s_2$ in shot 1, can be viewed collectively as actual source group 1, with the source group output being $y_1$, and the group offset being $(x_2+x_3)/2$. Similarly, the concurrent sources in shot 2 can be viewed as actual source group 2, with the group output being $y_3$ and the group offset being $(x_3+x_5)/2$, and so on. What we next do is to interpolate the group outputs $y_1, y_3, \ldots$, to obtain data at positions $(x_2+x_4)/2, (x_4+x_6)/2, \ldots$, to yield $\tilde{y}_2, \tilde{y}_4$, etc. This can be achieved by means of most interpolation techniques known in the art.

However, the interpolated data should preferably satisfy as best as possible the equalities posed in equation (2). Otherwise, equation (3) will not hold. The validity of equation (2) can be theoretically guaranteed by assuming a "perfect" and linear interpolation operator. Such a "perfect" and linear interpolator will be denoted by a short-hand notation $\mathcal{L}^{(1)}(\bullet)$. When applied on $s_1, s_3, \ldots$, to estimate signals that are located at positions $x_2, x_4, \ldots$, this interpolator should yield $$s_2, s_4, \ldots = \mathcal{L}_{(s_1, s_3, \ldots \to |x_2, x_4, \ldots)}. \qquad (4)$$

Likewise, applying this "perfect" and linear interpolator on $s_2, s_4, \ldots$, to estimate signals that are located at positions $x_3, x_5, \ldots$, we are able to obtain $$s_3, s_5, \ldots = \mathcal{L}_{(s_2, s_4, \ldots \to |x_3, x_5, \ldots)}. \qquad (5)$$

Due to the linearity of the interpolator, and the fact that $(x_2+x_4)/2$ is the group offset of a fictive source group with source located on $x_2$ and $x_3$, and $(x_4+x_6)/2$ is the group offset of a fictive source group located on $x_4$ and $x_5$, and so on, equations (4) and (5) can be added up yielding $$s_2+s_3, s_4+s_5, \ldots = \mathcal{L}(s_1+s_2, s_3+s_4, \ldots \rightarrow |(x_2+x_4)/2, (x_4+x_6)/2, \ldots). \quad (6)$$

On the other hand, if this "perfect" interpolator is applied on the measurements directly, on the actual source group level, this means that we use the group output $y_1, y_3, \ldots$, to estimate the fictive shot records at the group offsets $(x_2+x_4)/2$, $(x_4+x_6)/2$, ..., etc., as follows:

$$\tilde{y}_2, \tilde{y}_4, \ldots = \mathcal{L}(y_1, y_2, \ldots \rightarrow |(x_2+x_4)/2, (x_4+x_6)/2, \ldots). \quad (7)$$

The validity of equation (2) can readily be confirmed by comparison of the expressions in equations (6) and (7).

Figure 3:
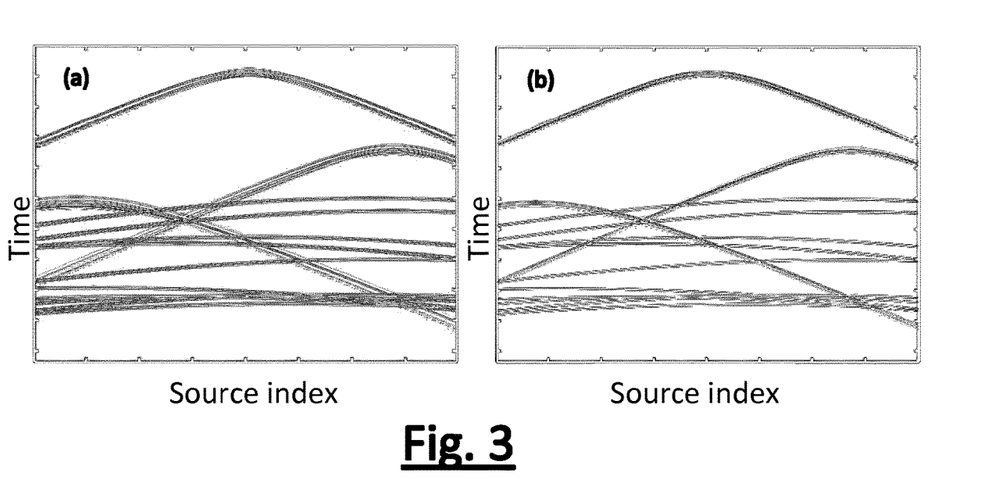
FIG. 3 (parts a and b) shows (a) a common-receiver gather with interpolated shot records from the data of FIGS. 2(b), and (b) the common-receiver gather with separated single source shot records after deconvolution.

The resulting intermediate interpolation and the final deconvolution results based on the data contained in FIG. 2(a) and FIG. 2(b) are given in FIG. 3(a) and FIG. 3(b), respectively.

The pilot signal signature can be removed (through correlation) either prior to or after the separation, because an identical pilot signal was assumed for all the sources.

Example B: FIG. 1(a) with Different Pilot Signals for Primary Sources Compared to Secondary Sources In Example A the pilot signals are identical for all sources. This might not always be desired in some situations. Actually, to comply with Rule 1 it is only required that the pilot signal used for all the primary sources is identical. The pilot signal for the primary sources does not need to be identical to the pilot signal for the secondary (and so on) sources. The separating approach for such a case can be similarly applied, with slight adaptation. This will now be illustrated based on the simultaneous shooting topology as shown in FIG. 1(a).

Let us use $p_A(\omega)$ and $p_B(\omega)$ to denote the time-domain pilot signals at a certain frequency $\omega$ for the primary and secondary sources, respectively. We use $s_k(w)$ to denote the earth transfer function at a certain frequency $\omega$ corresponding to the $k^{th}$ source, and $y_{2n-1}(\omega)$ to denote the actual shot record (measured trace) during shot n. Hence, $$y_1(\omega) = p_A(\omega)s_1(\omega) + p_B(\omega)s_2(\omega), \quad (8)$$
$$y_3(\omega) = p_A(\omega)s_3(\omega) + p_B(\omega)s_4(\omega),$$
$$\vdots$$

in which it can be seen that the definition of $s_k(\omega)$ is related to, but slightly different than, the definition of $s_k$ in the previous example. We then interpolate the (frequency-domain) signal to the positions at $(x_2+x_4)/2$, $(x_4+x_6)/2$, ..., to yield $\tilde{y}_2(\omega), \tilde{y}_4(\omega), \ldots$. Following the same reasoning as set forth in Example A, it follows mathematically that $$\tilde{y}_2(\omega) = p_A(\omega)s_2(\omega) + p_B(\omega)s_3(\omega), \quad (9)$$
$$\tilde{y}_4(\omega) = p_A(\omega)s_4(\omega) + p_B(\omega)s_5(\omega),$$
$$\vdots$$

provided that the interpolator is perfect and linear.

Combining equations (8) and (9) in matrix form yields $$\begin{bmatrix} y(\omega)_1 \\ \tilde{y}_2(\omega) \\ y_3(\omega) \\ \tilde{y}_4(\omega) \\ \vdots \end{bmatrix} = \underbrace{\begin{bmatrix} p_A(\omega) & p_B(\omega) & & & \\ & p_A(\omega) & p_B(\omega) & & \\ & & p_A(\omega) & p_B(\omega) & \\ & & & p_A(\omega) & p_B(\omega) \\ & & & & \vdots \end{bmatrix}}_{\tilde{B}(\omega)} \begin{bmatrix} s_1(\omega) \\ s_2(\omega) \\ s_3(\omega) \\ s_4(\omega) \\ \vdots \end{bmatrix}, \quad (10)$$

which is again of a convolutive form. As a consequence, the earth transfer function corresponding to each source can be obtained by deconvolution.

It is remarked that the separation approach in this Example is a combination of separation and correlation, the latter to get rid of the effect of the pilot signals in the final output. In contrast, in Example A only the separation processing is applied. It separates for each source the corresponding wavefield, which is the convolution between the pilot signal and the earth transfer function.

Example C: FIG. 1(b) with Identical Pilot Signals for all Sources

In this Example the shooting scheme of FIG. 1(b) is explored, assuming identical pilot signals for all the sources. The actual source groups and corresponding outputs can be expressed as $$y_1(\omega) = s_1 + s_4, \; y_2 = s_2 + s_5, \; y_3 = s_3 + s_6 \quad (11)$$
$$y_7(\omega) = s_7 + s_{10}, \; y_8 = s_8 + s_{11}, \; y_9 = s_9 + s_{12}$$
$$\vdots$$

whereby the group offsets are located at $(x_1+x_5)/2, \ldots, (x_3+x_7)/2, (x_7+x_{11})/2, \ldots, (x_9+x_{13})/2$. We then interpolate from these source group outputs some fictive shot records for fictive source groups located at $(x_4+x_8)/2$, $(x_5+x_9)/2$, $(x_6+x_{10})/2$ ... to yield $\tilde{y}_4, \tilde{y}_5, \tilde{y}_6$. These fictive traces $\tilde{y}$ that are related to the signals $s_k$ $$\tilde{y}_4 = s_4 + s_7, \quad (12)$$
$$\tilde{y}_5 = s_5 + s_8,$$
$$\tilde{y}_6 = s_6 + s_9,$$
$$\vdots$$

analog to Equation (2). Combining equations (11) and (12) yields $$\begin{bmatrix} y_1 \\ y_2 \\ y_3 \\ \tilde{y}_4 \\ \tilde{y}_5 \\ \tilde{y}_6 \\ y_7 \\ \vdots \end{bmatrix} = \underbrace{\begin{bmatrix} 1 & 0 & 0 & 1 & & & & \\ & 1 & 0 & 0 & 1 & & & \\ & & 1 & 0 & 0 & 1 & & \\ & & & \boxed{1} & \boxed{0} & \boxed{0} & \boxed{1} & \\ & & & & \boxed{1} & \boxed{0} & \boxed{0} & \boxed{1} \\ & & & & & \boxed{1} & \boxed{0} & \boxed{0} & \boxed{1} \\ & & & & & & 1 & 0 & 0 & 1 \\ & & & \vdots & & & & \end{bmatrix}}_{\tilde{B}} \begin{bmatrix} s_1 \\ s_2 \\ s_3 \\ s_4 \\ s_5 \\ s_6 \\ s_7 \\ \vdots \end{bmatrix}, \quad (13)$$

from which the signals $s_k$ can be resolved by deconvolution as before. The way the additional rows are inserted in to arrive at supplemented blending matrix $\tilde{B}$ differs from Equation (3) but is responsive to the same interpolation guideline.

Example D: FIG. 1(c) with Identical Pilot Signals for all Sources

For the shooting scheme of FIG. 1(c), the actual shot records $$\begin{aligned} y_1 &= s_1 + s_3 + s_4, \\ y_2 &= s_2 + s_4 + s_5, \\ y_3 &= s_3 + s_5 + s_6, \\ &\vdots \end{aligned} \quad (14)$$

are already complete. The interpolation step is not necessary, because the $n^{th}$ actual shot record $y_n$ already contains $s_n$ as the primary source for all indices n=1, 2, 3, . . . . As a result, the original blending matrix B already has a convolutive form.

Example E: FIG. 1(c) with Identical Pilot Signals for all Sources but Skipping Shots The shooting scheme of FIG. 1(c) does not result in less acquisition time than a single shooting scheme, because it is shot with full source position redundancy. Time can be saved by skipping shots, such as skipping shots 2, 3, 4, 6, 7, 8, 10, etc. These can be supplemented by interpolating the remaining actual shots 1, 5, 9, etc.

This concludes the specific examples. Some general remarks will now be made which are applicable to the proposed methods.

The methods proposed herein ensure that the received blended seismic signals, when sorted in any domain, such as for instance the common receiver domain, the common offset domain or the common midpoint domain, remains coherent. One advantage is that any coherency-based (pre-) processing of the data, such as groundroll removal, normal move-out or general coherent denoising techniques are possible in these domains prior to separating the data into single source shot records of single source signals.

Moreover, since the blended seismic signals are recorded with a coherent shooting scheme, the recorded seismic signals will be influenced by temporal-spatial filtering also known as so-called source array effects. These source array effects are predominantly governed by a combination of source group geometry and firing sequence. These are described with parameters defining the actual source group aperture, the periodicity of the grid of source positions, which grid positions within a source group that are selected to have an actual source, and the time interval between actuating the primary and secondary source (and time intervals between the primary source and any other lower ranked source such tertiary source, if so provided). When such parameters are the same for each shot, a space-invariant filter is generated. For instance, we already saw in Example A that the shooting geometry of FIG. 1(a) represents a moving average filter [1,1] if the concurrent sources are actuated exactly simultaneously with zero time delay. Likewise, the scheme illustrated in FIG. 1(b) features a [1, 0, 0, 1] filter, and the scheme illustrated in FIG. 1(c) a [1, 0, 1, 1] filter. Each of these filters have their own spatial filter responses. Also relevant, but usually to a lesser extent, are the pilot signals. It is thus possible to use these source array effects to attenuate certain seismic noise without impairment to the seismic wavefield that is produced in the earth formation. Parts of the coherent noise can be filtered from the data by tuning these parameters.

Defining actual source groups with larger numbers of sources can offer savings in the total acquisition time in the field, if source position redundancy is fully or partly avoided. FIG. 1(c) is an example of full source position redundancy, while source position redundancy is fully avoided if actual source groups do not spatially overlap with other actual source groups fired for earlier shots. However, the source array effects may become adverse when too many sources are included in an actual source group and moreover the interpolation becomes less certain. It is conceived that an optimum number of actual sources within each actual source group is more than one and/or less than six, preferably more than two. I.e. at least two and/or at most five sources, preferably at least three sources.

In demonstrating the separation methodology above, equal spacing between the sources was implicitly assumed. In practical operations this can be a very stringent requirement. However, it turns out the use of actual location of the sources in the interpolation process will not bring about visible performance degradation as long as the sources of all the actual source groups can be (mathematically) mapped to a selection of pre-plot source points on a source line consisting of a regular linear grid of discrete pre-plot source points.

Furthermore, it is remarked that many of the classical interpolators are linear in nature. As example reference is made to the Yen-4 interpolation described by H. Choi and D. C. Munson in "Analysis and design of minimax-optimal interpolators" (*IEEE Transactions on Signal Processing Vol. 46(6), pp. 1571-1579 (1998)*). Recently, interpolation via an $L_1$-norm solver, which leverages the sparsity of the signal in some proper domain, has attracted enormous attention. One commonly used $L_1$-norm solver is based on the basis pursuit principle. The basis pursuit can be reformulated in a linear-programming fashion, which is thus linear. With the above said, although the linearity of the interpolator was used to explain the viability of the proposed separation approach, in practice, we observe that relaxation of the linearity constraint on the interpolator will not inflict apparent detrimental effects.

The actual sources in the actual source groups emit within a frequency bandwidth ranging from a lower frequency $f_{min}$ to an upper frequency $f_{max}$. The actual sources are suitably vibrators, induced to vibrate in accordance with a frequency sweep that starts at $f_{min}$ and ends $f_{max}$. For typical vibrators, the lower frequency may for instance be 5 Hz and the upper frequency may for instance be 80 Hz.

Particularly in case of these coherent firing sequences within actual source groups, it is advantageous if the sources within one source group are relatively close to each other. This facilitates the subsequent separation of the sources from the blended signals. Relatively close in this context means that every source of any single source group has another source belonging to the same single source group located within a lateral vicinity radius of half of a minimum apparent seismic wavelength induced by the actual source. In equation format, the lateral vicinity radius equals $V_0/2f_{max}$, wherein $V_0$ represents a minimum apparent seismic velocity of a wave in the earth induced by the sources.

The steps of providing of actual shot records from the blended signals and/or said interpolation of the actual shot records and/or said separating of single source shot records, are suitably performed with a computer processor. The seismic gather that is generated may be outputted to an output device output device that is operatively coupled to the computer processor. The output device provides a tangible output that can be interpreted by a user. A non-limiting list of examples of output devices includes: a computer monitor, a television, a cathode ray tube, an LCD screen, a plasma screen, a projector, a plotter, a printer, and the like.

The system described herein may be deployed on land or in a marine environment off-shore. Suitably, the sources are vibrators. A seismic vibrator source for use on land consists generally of a baseplate configured in contact with the ground. The baseplate is usually supported on a truck. A seismic wave is induced in the subsurface earth formation by applying a vibratory force to the plate, and this is typically done by applying a control waveform known as a "pilot sweep" in the vibrator actuator system. The pilot sweep is generally a constant amplitude swept frequency signal, although the amplitude of the vibration may in practice be ramped up and down at the start and, respectively, finish of the sweep, for instance to manage inertia of the vibrator mass. Marine vibrators are also available, as evidenced by for instance an article from Western Geco: "Marine Vibrators and the Doppler Effect", by Dragoset, which appeared in Geophysics, November 1988, pp. 1388-1398, vol. 53, No. 11. More recently, Geokinetics has introduced its Aqua-Vib™ marine vibrator. Other examples exist.

The person skilled in the art will understand that the present invention can be carried out in many various ways without departing from the scope of the appended claims.

That which is claimed is:

1. A method for generating a seismic gather, comprising:
   providing an initial gather of blended seismic signals induced in a common seismic receiver by a plurality of sources that are actuated in actual source groups, wherein the sources belonging to one actual source group, when actuated, cause mutually interfering wavefields in an earth formation which give rise to the blended seismic signals in the common receiver, wherein the sources in each actual source group are positioned relative to one primary source and according to a linear source geometry that is the same for each actual source group, and wherein the plurality of sources in each actual source group is fired according to a pre-selected firing sequence that is the same for each actual source group, and wherein successive actual source groups are fired one after another with sufficient time delay between firing of the successive actual source groups to avoid interference in time-frequency domain of a seismic wave field produced in the earth formation by each of the actual source groups with the seismic wave field produced in the earth formation by any other of the actual source groups, and wherein the successive actual source groups are laterally displaced from each other whereby the plurality of sources of all the actual source groups are mapped to a selection of pre-plot source points on a source line consisting of a regular grid of discrete pre-plot source points;
   providing actual shot records from the blended signals;
   creating fictive shot records of seismic signals for fictive source groups that each have the same source geometry as the actual source groups, by interpolation of the actual shot records with a selected interpolation operator working on the actual shot records, whereby every pre-plot source point on the source line is uniquely occupied by one primary source out of a set of primary sources of the actual source groups and the fictive source groups taken together, such that every pre-plot source point on the source line has one primary source and every primary source has one pre-plot source point;
   separating single source shot records of single source signals by discrete deconvolution of the actual shot records and the fictive shot records whereby separating signals; and
   outputting a seismic gather comprising a plurality of the single source shot records for a range of source points.

2. The method of claim 1, wherein said pre-selected firing sequence comprises actuating each source in one actual source group simultaneously.

3. The method of claim 1, wherein said pre-selected firing sequence comprises actuating each primary source and each secondary source within each actual source group with a constant pre-determined non-zero time interval between actuating the primary and secondary source.

4. The method of claim 1, wherein said pre-selected firing sequence comprises actuating each source in one actual source in accordance with one pilot signal.

5. The method of claim 1, wherein each actual source group comprises at least three sources.

6. The method of claim 1, wherein each actual source group comprises at most five sources.

7. The method of claim 1, wherein said pre-plot source points are each occupied by at most one source of at most one actual source group.

8. The method of claim 1, wherein the sources in the actual source groups emit within a frequency bandwidth ranging from a lower frequency $f_{min}$ to an upper frequency $f_{max}$.

9. The method of claim 8, wherein every source within any of the single actual source groups is located within a lateral vicinity radius from at least one other source within the same actual source group, wherein the vicinity radius is half of a minimum apparent induced seismic wavelength, which equates to $V_0/2f_{max}$ wherein $V_0$ represents a minimum apparent seismic velocity of a wave in the earth formation induced by the sources.

10. The method of claim 1, wherein said providing of actual shot records from the blended signals and/or said interpolation of the actual shot records and/or said separating of single source shot records, are performed with a computer processor, and wherein said outputting of the seismic gather is performed using an output device operatively coupled to the computer processor.

11. A system for generating a seismic gather, comprising:
   a computer readable storage medium on which is stored an initial gather of blended seismic signals induced in a common seismic receiver by a plurality of sources that are actuated in actual source groups, wherein the sources belonging to one actual source group, when actuated, cause mutually interfering wavefields in an earth formation which give rise to the blended seismic signals in the common receiver, wherein the sources in each actual source group are positioned relative to one primary source and according to a linear source geometry that is the same for each actual source group, and wherein the plurality of sources in each actual source group is fired according to a pre-selected firing sequence that is the same for each actuation of each actual source group, and wherein successive actual source groups are fired one after another with sufficient time delay between firing of the successive actual source groups to avoid interference in time-frequency domain of a seismic wave field produced in the earth formation by each of the actual source groups with the seismic wave field produced in the earth formation by any other of the actual source groups, and wherein the successive actual source groups are laterally displaced from each other whereby the plurality of sources of all the actual source groups are mapped to a selection of pre-plot source points on a source line consisting of a regular linear grid of discrete pre-plot source points;

a computer processor operatively coupled to the computer readable storage medium and programmed to:

create actual shot records from the blended signals;

create fictive shot records of seismic signals for fictive source groups that each have the same source geometry as the actual source groups, by interpolation of the actual shot records with a selected interpolation operator working on the actual shot records, whereby every pre-plot source point on the source line is uniquely occupied by one primary source out of a set of primary sources of the actual source groups and the fictive source groups taken together, such that every pre-plot source point on the source line has one primary source and every primary source has one pre-plot source point;

separate single source shot records of single source signals by discrete deconvolution of the actual shot records and the fictive shot records whereby separating signals; and an output device operatively coupled to the computer processor and configured to output a seismic gather comprising a plurality of the single source shot records for a range of source points.

12. A method of recording blended seismic signals induced in a common seismic receiver, comprising:

actuating a plurality of actual sources grouped in actual source groups, wherein the sources belonging to one actual source group, when actuated, cause mutually interfering wavefields in an earth formation which give rise to the blended seismic signals in the common receiver, wherein the sources in each actual source group are positioned relative to one primary source and according to a linear source geometry that is the same for each actual source group, and wherein the plurality of sources in each actual source group is actuated according to a pre-selected firing sequence that is the same for each actuation of each actual source group, and wherein successive actual source groups are fired one after another with sufficient time delay between firing of the successive actual source groups to avoid interference in time-frequency domain of a seismic wave field produced in an earth formation by each of the actual source groups with the seismic wave field produced in the earth formation by any other of the actual source groups, and wherein the successive actual source groups are laterally displaced from each other whereby the plurality of sources of all the actual source groups are mapped to a selection of pre-plot source points on a source line consisting of a regular grid of discrete pre-plot source points; and recording the blended seismic signals from each of the actual groups by at least one common seismic receiver;

wherein the blended seismic signals are processable by:

providing actual shot records from the blended signals;

creating fictive shot records of seismic signals for fictive source groups that each have the same source geometry as the actual source groups, by interpolation of the actual shot records with a selected interpolation operator working on the actual shot records, whereby every pre-plot source point on the source line is uniquely occupied by one primary source out of a set of primary sources of the actual source groups and the fictive source groups taken together, such that every pre-plot source point on the source line has one primary source and every primary source has one pre-plot source point;

separating single source shot records of single source signals by discrete deconvolution of the actual shot records and the fictive shot records whereby separating signals; and outputting a seismic gather comprising a plurality of the single source shot records for a range of source points.

\* \* \* \* \*

UNITED STATES PATENT AND TRADEMARK OFFICE
CERTIFICATE OF CORRECTION

PATENT NO. : 11,385,372 B2
APPLICATION NO. : 16/064353
DATED : July 12, 2022
INVENTOR(S) : Zijian Tang et al.

It is certified that error appears in the above-identified patent and that said Letters Patent is hereby corrected as shown below:

In the Specification

In Column 8, Line 42, delete "$(x_2+x_3)/2.$" and insert -- $(x_1+x_3)/2.$ --.

In Column 9, Line 42, delete "$s_k(w)$" and insert -- $s_k(\omega)$ --.

In Column 10, Line 45, delete "$y_1(\omega) = s_1 + s_4, y_2 = s_2 + s_5, y_3 = s_3 + s_6$
$y_7(\omega) = s_7 + s_{10}, y_8 = s_8 + s_{11}, y_9 = s_9 + s_{12}$"
and insert -- $y_1 = s_1 + s_4, y_2 = s_2 + s_5, y_3 = s_3 + s_6$
$y_7 = s_7 + s_{10}, y_8 = s_8 + s_{11}, y_9 = s_9 + s_{12}$ --.

Signed and Sealed this
Sixth Day of September, 2022

Katherine Kelly Vidal
*Director of the United States Patent and Trademark Office*